United States Patent [19]

Hennig

[11] Patent Number: 4,693,388
[45] Date of Patent: Sep. 15, 1987

[54] COVER ARRANGEMENT
[75] Inventor: Kurt Hennig, Munich, Fed. Rep. of Germany
[73] Assignee: Gebr. Hennig GmbH, Fed. Rep. of Germany
[21] Appl. No.: 874,442
[22] Filed: Jun. 16, 1986
[30] Foreign Application Priority Data Jun. 26, 1985 [DE] Fed. Rep. of Germany ....... 3522887

[51] Int. Cl.⁴ .............................................. B65D 8/14
[52] U.S. Cl. ........................................................ 220/8
[58] Field of Search ............................ 220/8, 297, 444
[56] References Cited

U.S. PATENT DOCUMENTS

| 37,113 | 12/1862 | Sherwood | 220/297 |
| 2,216,830 | 10/1940 | Roberts | 220/444 |
| 3,105,592 | 10/1963 | Cohen | 220/8 |
| 3,454,151 | 7/1969 | Plaskar | 220/8 |
| 3,463,343 | 9/1969 | Asenbauer | 220/8 |
| 3,838,680 | 10/1974 | Shipman | 220/8 |

FOREIGN PATENT DOCUMENTS

| 418393 | 12/1940 | France | 220/8 |
| 614079 | 12/1948 | United Kingdom | 220/8 |

Primary Examiner—George E. Lowrance
Attorney, Agent, or Firm—George M. Thomas

[57] ABSTRACT

The invention relates to a cover arrangement for industrial equipment in which individual cover elements are telescopically arranged and one cover element has a groove running in the direction of relative movement of the cover elements with respect to each other and the head portion of a guide element is fixed on the adjacent cover element and the head of the guide element engages in the narrowed inner region of the said groove. Such a cover arrangement is distinguished above all by very simple assembly and dismantling.

6 Claims, 8 Drawing Figures

COVER ARRANGEMENT

BACKGROUND OF THE INVENTION

The invention relates to a telescopic cover arrangement for industrial equipment, for storing and protecting the equipment.

In the previously known cover arrangements, such as telescopic covers, louvred covers and the like, the individual cover elements generally engage behind a horizontal guideway or a vertical stand of a machine tool and are connected by this engagement both to one another and to the stationary machine part.

Because of this necessary engagement the assembly and dismantling of these known cover arrangements is comparatively complicated.

An object of the invention is to construct a cover arrangement for industrial equipment in such a way that the cover can be assembled and dismantled in a particularly simple way.

An embodiment of the invention is illustrated in the drawings.

DETAILED DESCRIPTION

Figure 1:
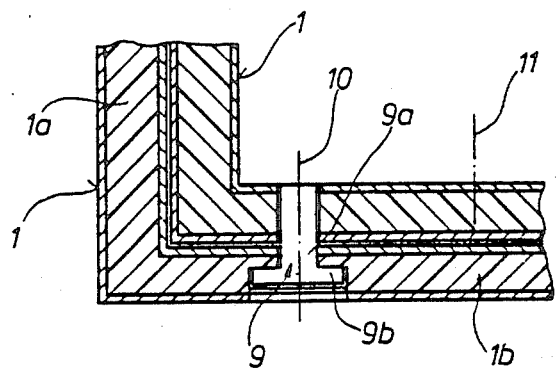
FIG. 1 shows a partial section through two cover boxes of a telescopic cover.
Figure 2:
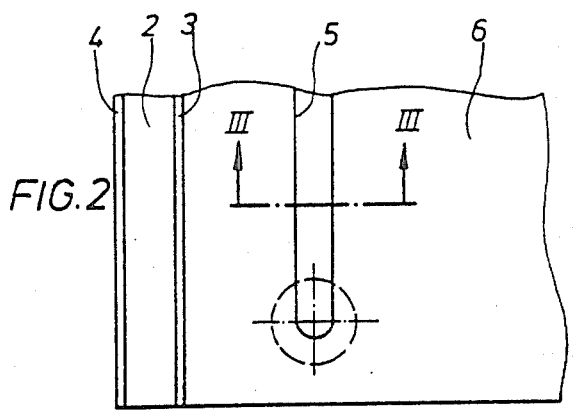
FIG. 2 shows a plan view of the outer cover box according to FIG. 1.

The illustrated telescopic cover comprises a plurality of cover boxes of which only two cover boxes 1 and 1' are shown in part in FIG. 1. The cover boxes 1, 1' are movable relative to one another at right angles to the drawing plane of FIG. 1.

First of all the construction of the cover box 1 will be explained in greater detail below. Its wall consists of an inner layer 2 made from plastics material and two outer metallic coating layers 3 and 4. The two lateral flanks 1a of the cover box 1 are bent relative to the top wall 1b so as to give the cover box a U-shaped cross-sectional profile.

The cover box 1 contains two grooves 5 which run in the direction of movement (i.e. at right angles to the drawing plane of FIG. 1); of these only the groove 5 located in the proximity of the left-hand flank 1a is visible in the drawing.

Figure 3:
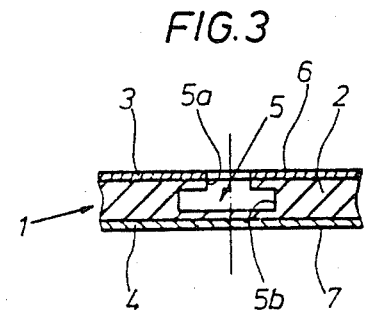
FIG. 3 shows a section along the line III—III of FIG. 2

This groove 5 is open over its entire length towards the upper (first) broad side 6 of the cover element 1. The groove 5 is only connected to the lower, second broad side 7 via an opening 8 at one end of the groove. In the region 5a of the groove 5 adjacent to the first broad side 6 the groove 5 has smaller breadth than in its inner region 5b (c. FIG. 3). This gives the groove 5 an approximately T-shaped cross-sectional profile.

The adjacent cover box 1' is provided with a guide element 9 in the form of a screw, the shaft portion 9a of which passes through the narrowed region 5a of the groove 5 of the cover box 1 whilst its broadened head portion 9b engages so as to lock positively in the inner region 5b of the groove 5.

A second guide element 9 is fixed in the region of the second long side (not shown) of the cover box 1' and engages in a corresponding manner in the second groove 5 of the cover box 1.

Figure 4:
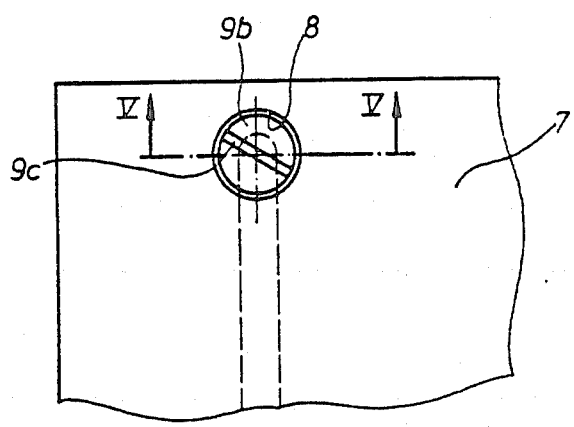
FIG. 4 shows a view of the cover box according to FIG. 2 from below.

The opening 8 which has already been mentioned on the lower borad side 7 of the cover box 1 is at least as large as the head portion 9b of the guide element 9. The guide element 9 can therefore be introduced through the opening 8 from the lower broad side 7 of the cover box 1 and screwed to the cover box 1'. In the state in which the two cover boxes 1, 1' are completely telescoped together (cf. FIG. 4) the head portion 9b of the guide element 9 is located exactly below the opening 8, so that the guide elmeent 9 can be unscrewed by means of a screwdriver engaging in the slot 9c in the head portion 9b. After the two guide elements 9 have been unscrewed the cover box 1 can be removed from the cover box 1' without further ado.

After the cover box 1 has been removed the guide elements 9 which connect the cover box 1' to the next smaller cover box are then accessible. In this way the assembly and dismantling of the whole telescopic cover can be carried out in a very simple manner. It is particularly advantageous that all working operations can be carried out from the front or from above, that is to say from the readily accessible broad side of the telescopic cover. Thus the complicated assembly and dismantling of engaging parts which is necessary in the known constructions is omitted in the region of the lateral flanks 1a of the individual cover boxes.

The openings 8 are located in each case in the region of the individual cover boxes which even in the most fully extended state of the telescopic cover is overlapped in each case by the larger cover box. Therefore in the completely assembled telescopic cover (both in the telescoped state and in the extended state) only the openings 8 in the outermost (largest) cover box 1 are visible. If desired, these can be closed by a releasable stopper in order to prevent the penetration of dirt and foreign bodies into the interior of the telescopic cover.

The grooves 5 of adjacent cover boxes are offset relative to one another at right angles to the direction of movement. Thus in FIG. 1 the centre line of the groove 5 of the outermost cover box 1 is designated by 10 and the centre line of the groove 5 of the adjacent cover box 1' is designated by 11.

The way in which the groove 5 and the opening 8 are produced in a cover box will now be described in detail with the aid of FIGS. 5 and 6.

Figure 5:
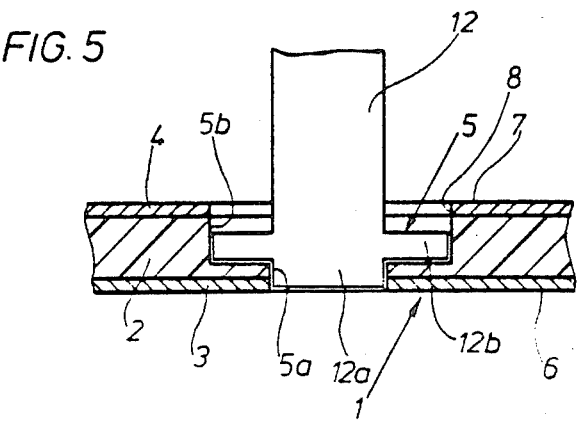
FIG. 5 shows a sectional representation (along the line V—V in FIG. 4) during the first phase of the production of the groove.
Figure 6:
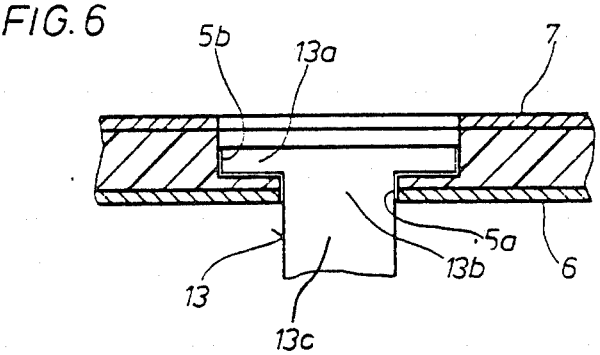
FIG. 6 shows a section corresponding to FIG. 5 during the second phase of the production of the groove.
Figure 7:
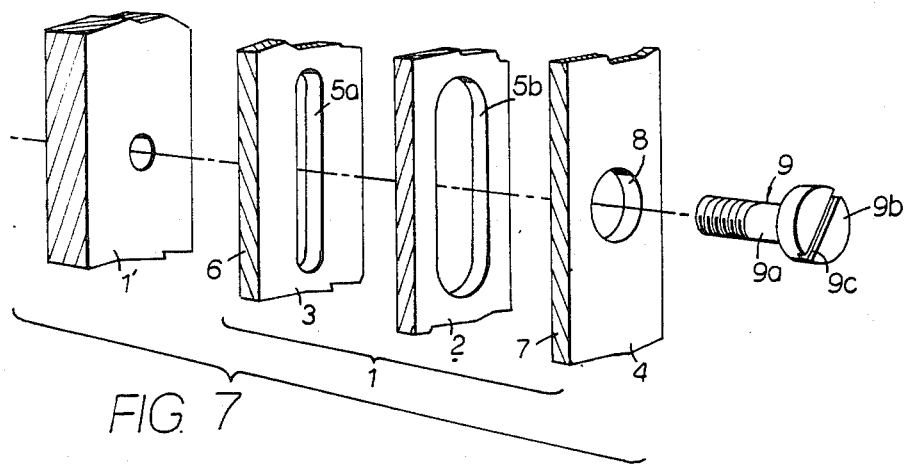
FIG. 7 shows an expanded perspective view of the portions of adjacent parallel walls of adjacent cover boxes, with the layers of the wall of the outer box separated to illustrate the shapes of the groove of the wall.
Figure 8:
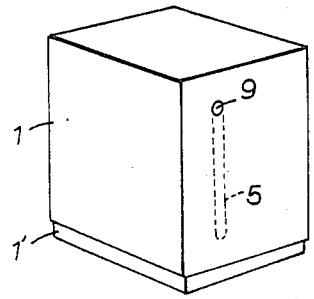
FIG. 8 shows a perspective view of a pair of cover boxes of a telescopic cover.

First of all, from the second broad side 7 of the cover box 1 a hole which extends to the first broad side 6 is produced with a first milling tool 12, the cross-section of the said hole being smaller in the region adjoining the first broad side 6 than in the region adjoining the second broad side 7 (cf. FIG. 5). For this purpose the milling tool 12 has a front portion 12a the breadth of which is approximately that of the groove 5 which is to be produced. Furthermore the milling tool 12 is provided with a widened part 12b the breadth of which corresponds to the breadth of the inner region 5b of the groove 5. At the same time this widened part 12b of the milling tool 12 provides the opening 8 on the broad side 7. Then in a second operation (cf. FIG. 6) a second milling tool 13, the front end 13a of which serves for milling the inner region 5b of the groove 5 whilst its adjoining part 13b produces the narrowed region 5a of the groove 5 and its shaft 13c projects over the broad side 6, is introduced from the second broad side 7 into the hole which has been formed as described above.

Thus the milling tool 12 creates a hole through which the milling tool 13 used for the actual production of the groove 5 is then introduced.

Numerous variants are possible within the scope of the invention.

For instance the cover boxes do not have to be produced from the compound material referred to above but can also be be made in one piece, for example from aluminium or plastics material.

Furthermore, the invention is not restricted to telescopic covers with cover boxes of the shape illustrated. It can also be used for example in louvred covers which consist of individual flat cover elements (without bent lateral flanks).

In such cover arrangements which do not have lateral flanks as additional guide means in the longitudinal movement of the cover elements it can be advantageous in order to achieve good tilt-free guiding if two guide elements arranged spaced from one another (or one elongated guide element) engage in each groove.

A significant advantage of the cover arrangement according to the invention resides in the fact that no special elements such as rear wall bends are necessary in order to ensure that during the extending movement the adjacent cover element is entrained in each case. In the cover arrangement according to the invention the entrainment is achieved by the guide elements of the adjacent cover element. The guide elements thus fulfil a number of functions: they produce the connection to the adjacent cover element (and thus ensure that the cover arrangement holds together), effect the longitudinal guiding during the extending movement and finally ensure the entrainment of the next box in each case.

I claim:

1. A cover assembly for industrial equipment and the like comprising at least two cover elements (1, 1') with walls which overlap one another and which are telescopically movable relative to one another, and connector means for holding the overlapped walls of the cover elements together in sliding relationship and for guiding the movements of the cover elements with respect to each other, the improvement therein of said connector means comprising the overlapped wall of one of said cover elements (1) including at least one elongated groove (5) formed in said wall with the length of said groove extending in the directions of the relative movements of the cover elements, said groove comprising a first relatively narrow elongated slot openings (5a) formed through the outer surface of said wall and facing the adjacent cover element (1') and an internal relatively wider portion (5b) formed internally of the wall and overlapping said narrow width portion, and an opening (8) formed through the other outer surface of said wall and facing away from said adjacent cover element (1'), the adjacent overlapped wall of said other cover element (1') defining an opening therein aligned with the groove of said first cover element, and a guide element (9) including a stem (9a) inserted into the opening of the adjacent wall of said other cover element and extending through the relatively narrow width portion of said groove and including an enlarged head (9b) of a breadth larger than the narrow width portion of said grove positioned in the internal portion of said groove, so that when the cover elements are moved relative to one another the guide element slides along the length of the groove and the narrow portion of the groove captures the head of the guide element and access is provided to the guide element when the opening of the other outer layer of the wall of said one cover element is aligned with the connector.

2. The cover assembly as claimed in claim 1, characterised by the following further feature:

the opening (8) is located in the region of the cover element (1) which is overlapped by the adjacent cover element (1') in the most fully extended state of the cover assembly.

3. The cover assembly as claimed in claim 1, characterised by the following further features:

the cover elements (1, 1') consist of an inner layer (2) made from plastics material and two outer metallic coating layers (3, 4), and the groove (5) extends through one coating layer (4) and at least a part of the inner layer (2).

4. The cover assembly as claimed in claim 1, characterised by the following further feature:

the cover elements each are made in one piece, preferably from aluminium or plastics material.

5. The cover assembly as claimed in claim 1, characterised by the following further feature:

each cover element (1, 1') contains at least two grooves (5) which are arranged parallel to each other.

6. A cover assembly for industrial equipment and the like comprising at least two adjacent cover elements with parallel walls which overlap one another and which are telescopically movable relative to one another, and connector means for holding the walls of the cover elements together in sliding relationship and for guiding the movements of the cover elements with respect to each other, the improvement therein of said connector means comprising a first one of said cover elements including a wall with an inner layer (2) and outer layers (3 and 4) on opposite sides of said inner layer, at least one elongated groove (5) formed in said wall with the length of said groove extending in the directions of the relative movements of the cover elements, said groove comprising a first relatively narrow portion (5a) formed in one of said outer layers of said wall and facing the adjacent cover element, an internal relatively wider portion (5b) formed in the inner layer of the wall and overlapping said narrow width portion, and an opening (8) through the other of said outer layers of said wall at one end of said internal portion of said groove and facing away from said adjacent cover element, the adjacent wall of said adjacent cover element defining an opening therein aligned with the groove of said first cover element, and a guide element (9) including a stem (9a) inserted into the opening of the adjacent wall of said adjacent cover element and extending through the relatively narrow width portion of said groove and including an enlarged head (9b) of a breadth larger than the narrow width portion of said grooves positioned in the internal portion of said groove, so that when the cover elements are moved relative to one another the guide element slides along the length of the groove and the narrow portion of the groove captures the head of the guide element and access is provided to the guide element when the opening of the other outer layer of the wall is aligned with the connector.

* * * * *